(12) United States Patent
Wang

(10) Patent No.: US 7,228,775 B2
(45) Date of Patent: Jun. 12, 2007

(54) SLIDING MITER SAW

(75) Inventor: Xin Wang, Pingjiang District of Suzhou (CN)

(73) Assignee: Positec Power Tools (Suzhou) Co., Suzhou (CN)

( * ) Notice: Subject to any disclaimer, the term of this patent is extended or adjusted under 35 U.S.C. 154(b) by 116 days.

(21) Appl. No.: 10/694,443

(22) Filed: Oct. 28, 2003

(65) Prior Publication Data
US 2004/0134323 A1 Jul. 15, 2004

(30) Foreign Application Priority Data
Oct. 31, 2002 (CN) ................................ 02 1 38579

(51) Int. Cl.
*B27B 5/18* (2006.01)
(52) U.S. Cl. ..................... 83/471.3; 83/486.1; 83/490; 83/581
(58) Field of Classification Search .................. 83/581, 83/487, 486.1, 468.3, 471.3, 473, 490, 485, 83/489, 471.2, 477.1, 574
See application file for complete search history.

(56) References Cited

U.S. PATENT DOCUMENTS

| | | | | |
|---|---|---|---|---|
| 1,528,536 A | * | 3/1925 | De Walt | 83/471.3 |
| 1,646,589 A | * | 10/1927 | Meek et al. | 83/471.3 |
| 3,498,345 A | * | 3/1970 | Sexton | 83/471.2 |
| 4,265,154 A | * | 5/1981 | Batson | 83/468 |
| 4,441,394 A | * | 4/1984 | Barsotti | 83/409 |
| 4,587,875 A | | 5/1986 | Deley | |
| 5,220,857 A | * | 6/1993 | Freeburger | 83/468.3 |
| 5,564,323 A | | 10/1996 | Sasaki et al. | |
| 5,768,967 A | | 6/1998 | Sasaki et al. | |
| 5,816,129 A | * | 10/1998 | Singer | 83/468.3 |
| 5,870,939 A | * | 2/1999 | Matsubara | 83/471.3 |

FOREIGN PATENT DOCUMENTS

JP 2002-200601 6/2002

OTHER PUBLICATIONS

Patent Abstracts of Japan, vol. 2002, No. 11 (Jun. 11, 2002), JP 2002 200601 (Makita Corp.).

* cited by examiner

*Primary Examiner*—Boyer D. Ashley
*Assistant Examiner*—Omar Flores Sánchez
(74) *Attorney, Agent, or Firm*—Berenato, White & Stavish, LLC

(57) ABSTRACT

A sliding miter saw is provided, the saw including a base device, a motor, a saw blade, a bracket for a saw unit and a ram slidably received in a guiding groove provided along a diametrical direction of a turntable. A rear end portion of the ram is connected to a lower portion of a supporting member. By exploiting the ram sliding in the guiding groove, the supporting member may be made thick and rigid. A front end portion of the ram always lies under the saw blade and the ram moves backward synchronously with the saw unit so that the invention is able to spare operating space and storage space.

13 Claims, 10 Drawing Sheets

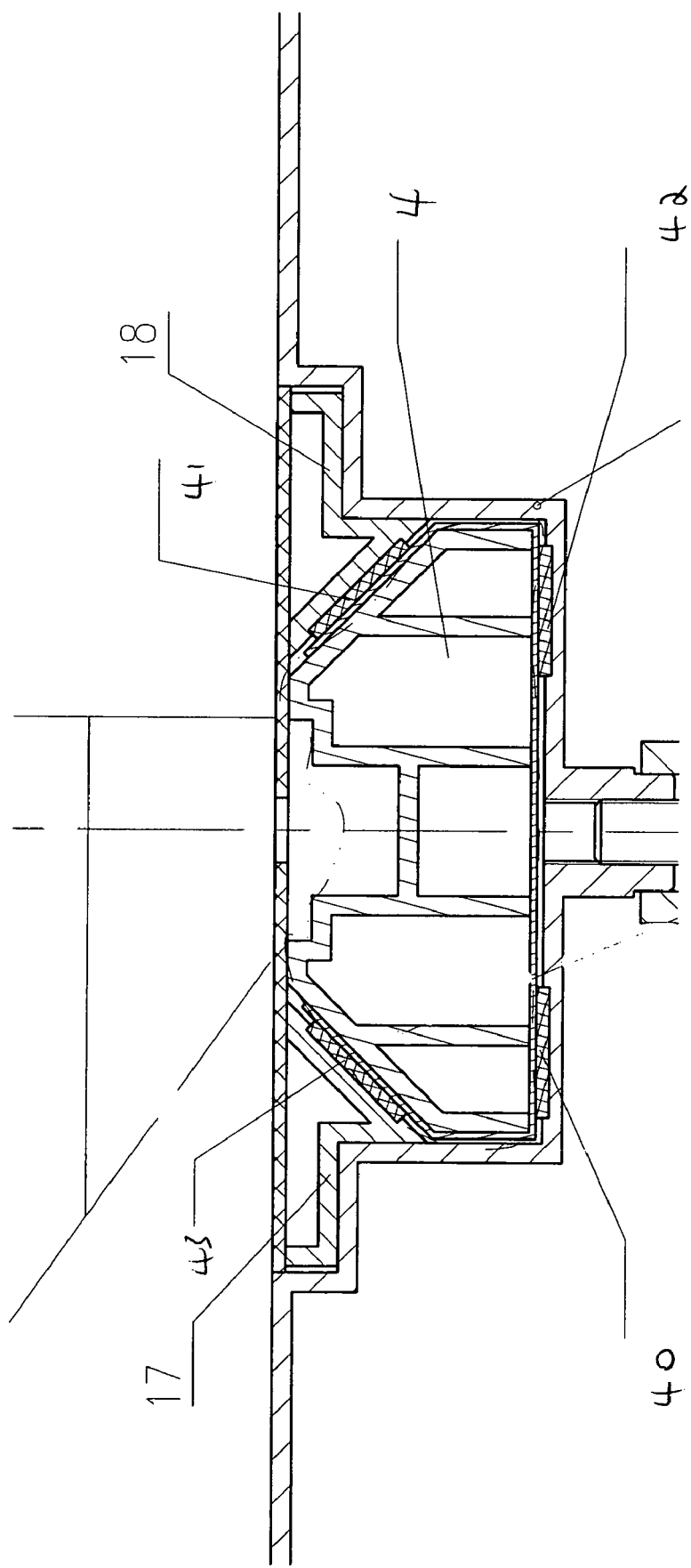

SLIDING MITER SAW

RELATED APPLICATION

This application claims priority of Application No. 02138579.3 filed in China on Oct. 31, 2002, the disclosure of which is incorporated herein by reference.

BACKGROUND OF THE INVENTION

1. Field of the Invention

The present invention relates to a sliding miter saw.

2. Description of Related Art

U.S. Pat. No. 5,239,906 discloses a miter saw comprising a base, a sliding member, a sliding device, and a guiding means which is a cantilever. The sliding device slides back and forth on the guiding means. However, a safety drawback of this structure is that the cantilever is insufficiently rigid to support the heavy saw unit which slides and operates on it.

SUMMARY OF THE INVENTION

The present invention relates to a new improved and reliable sliding miter saw, particularly a sliding miter saw having a highly rigid supporting member for the saw unit.

Thus the present invention provides a sliding miter saw comprising a base device including a base and a turntable which is pivotally connected to the base. A saw unit includes a saw blade and a motor. The motor which includes an armature having a first rotating axis is connected to the saw blade which has a second rotating axis via a transmission device. The first rotating axis is parallel with and spaced apart from the second rotating axis. A bracket upon which is mounted the saw unit has a rear end portion which is pivotally joined to an upper portion of a supporting member on which a hinge pivot shaft is provided. The bracket has an axis about which the saw unit can be raised and lowered between an elevated non-working position and a non-elevated working position. The sliding miter saw also includes a ram slidably received in a guiding groove which extends along the turntable in a substantial diametrical direction. A rear end portion of the ram is pivotally joined to a lower end portion of the supporting member.

By advantageously exploiting a ram sliding on a turntable of the present invention, the supporting member for supporting the saw unit is able to be made sufficiently thick to optimize rigidity. Moreover a front end portion of the ram always lies under the saw blade allowing the ram to move synchronously with the saw unit so that the invention is sparing with operating and storage space. Preferably an elongate slot in a front portion of the ram receives the saw unit and moves synchronously with the saw unit in forward and rearward directions.

Preferably the guiding groove extends fully along the turntable in the substantially diametrical direction whereby a front end portion of the ram extends beyond the edge of the turntable when the ram is at its extreme position.

Preferably the guiding groove incorporates a linear bearing.

Preferably the sliding miter saw comprises one or more retaining members fixed in, on or to the guiding groove for retaining the ram in the guiding groove. Particularly preferably the retaining member is a fixed compressor plate.

Preferably an elongate slot in a front portion of the ram receives the saw blade when the saw unit is pivoted to its non-elevated working position.

Preferably opposing edges of the upper surface of the base pivotally connect to a first end portion of horizontally disposed first and second additional supporting members respectively, wherein the second end portion of the additional supporting members extends beyond the base.

Preferably an elastic member provided on the additional supporting member biases the saw unit to the non-mitering position. For example, the elastic member may exert a restoring force eg a torsion spring. Typically a first end of the torsion spring connects with the additional supporting member and a second end of the torsion spring connects with the base.

Preferably the upper surface of the base is provided with a guiding channel for guiding the additional supporting member in a substantially circumferential (eg arcuate) direction through the action of a dependent supporting foot which is moveably received in the guiding channel.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings:

FIG. 11 illustrates a cross sectional view of the ram of the first embodiment.

DESCRIPTION OF THE CERTAIN PREFERRED EMBODIMENTS

Figure 1:
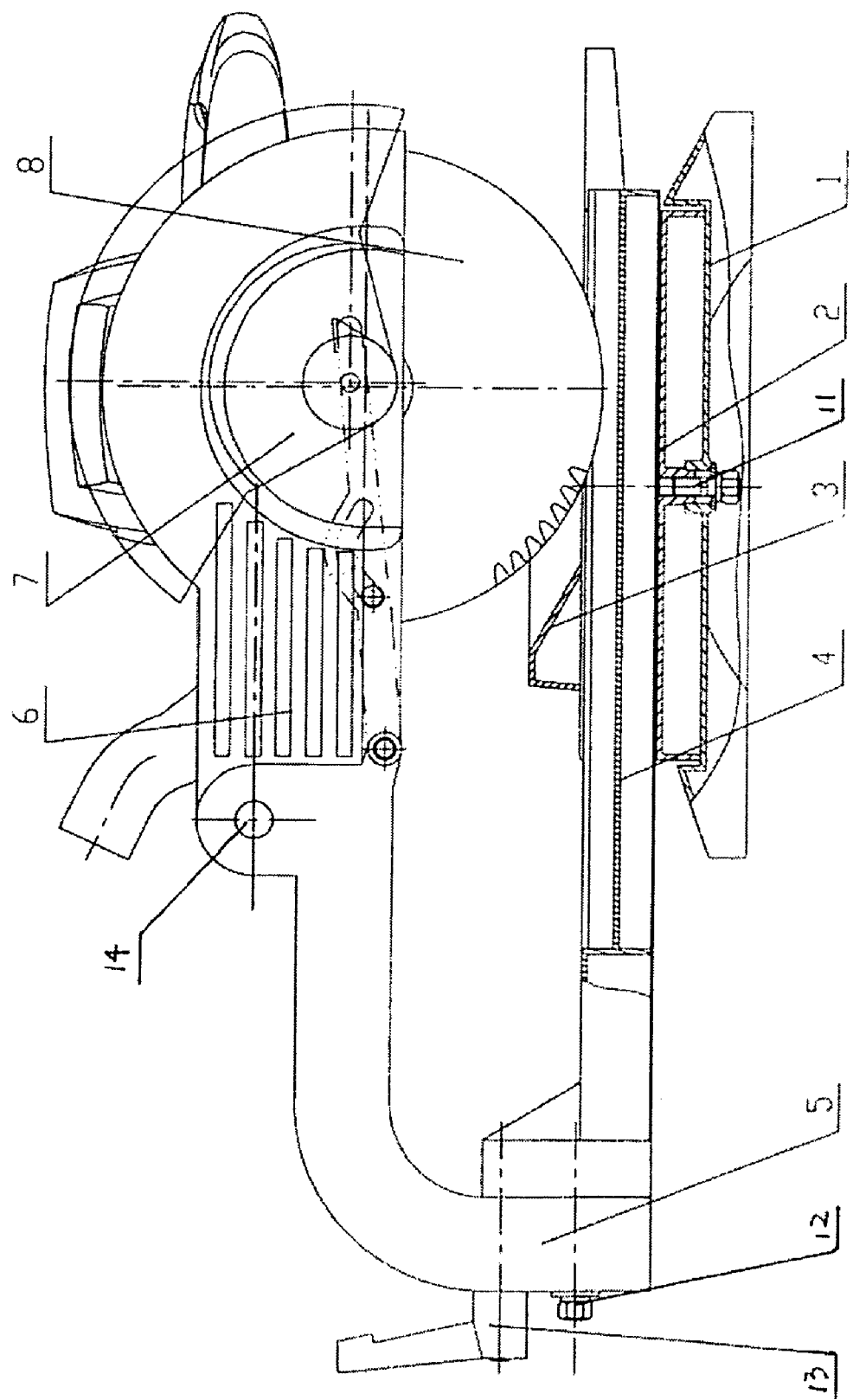
FIG. 1 shows a left side view of a first embodiment of the present invention in which the saw unit is pushed out.

FIG. 1 illustrates a sliding miter saw comprising a base device including a base [1] and a turntable [2] which is pivotally connected to the base [1] about an axis [11]. A saw unit includes a motor (omitted for the sake of clarity) which itself includes an armature having a first rotating axis and a saw blade [8] with a second rotating axis upon which is mounted a hood [7]. The first rotating axis is parallel with and spaced apart from the second rotating axis. A bracket [6] for the saw unit has a rear end portion which is pivotally joined to an upper portion of a supporting member [5]

(which has an axis [12]). The bracket has an axis [14] about which the saw unit can be moved between an elevated non-working position and a non-elevated working position. The motor is connected to the saw blade [8] via a transmission device for transmitting power to the saw blade [8].

Figure 2:
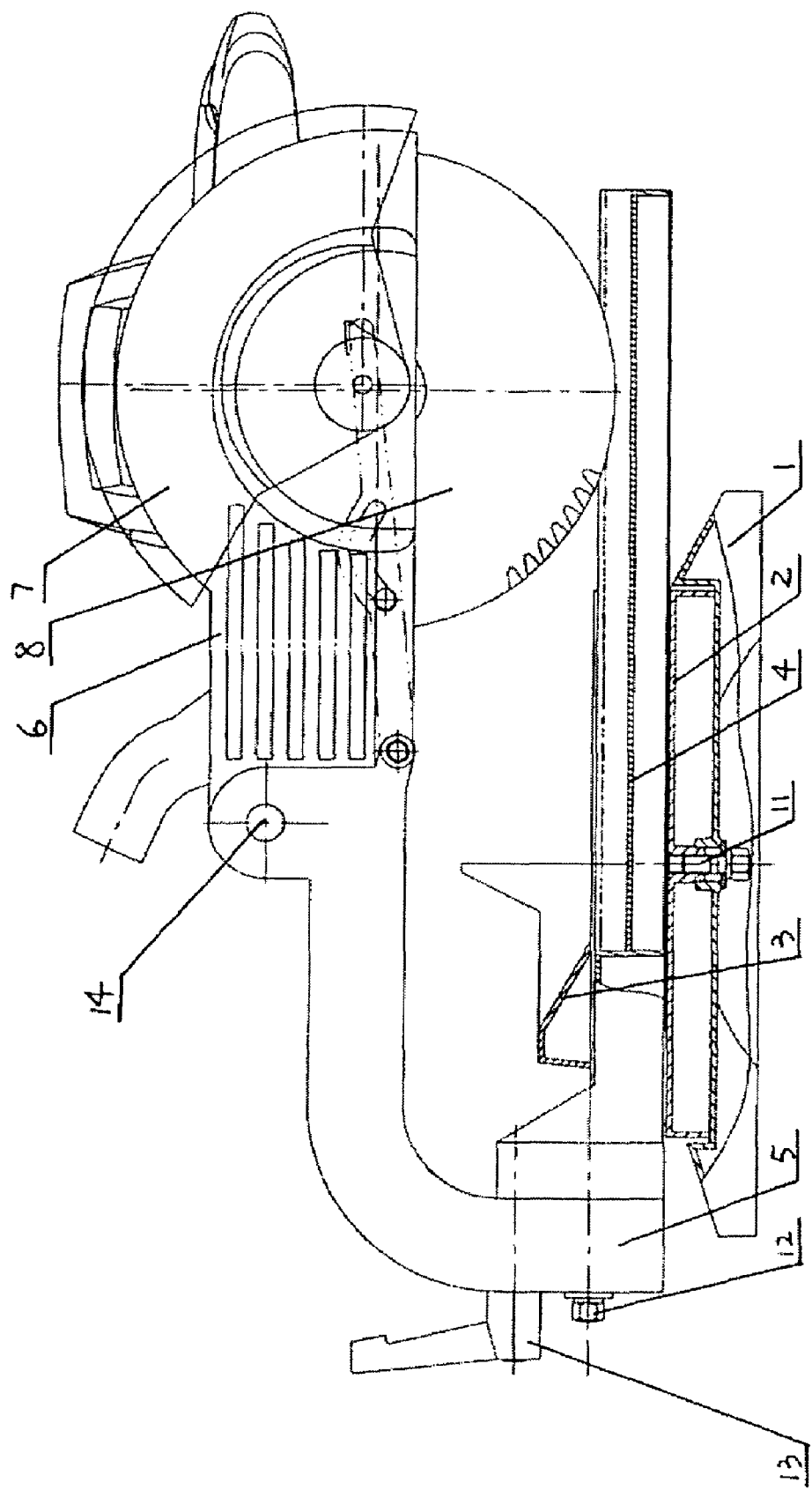
FIG. 2 shows a left side view of the first embodiment of the present invention in which the saw unit is pulled back.
Figure 3:
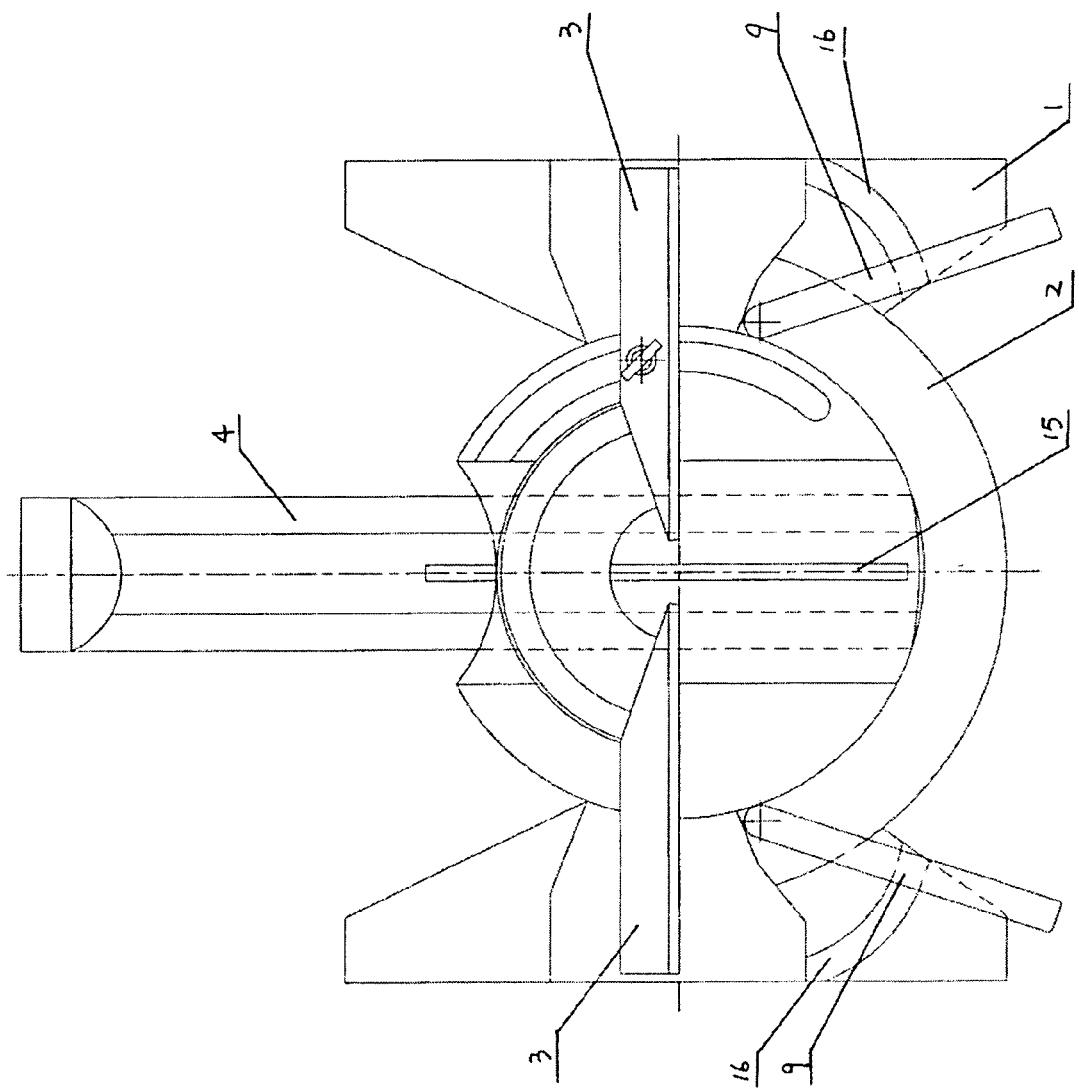
FIG. 3 shows a top view of the first embodiment of the present invention in which the ram is pushed out (with the saw unit and the supporting member omitted)
Figure 6:
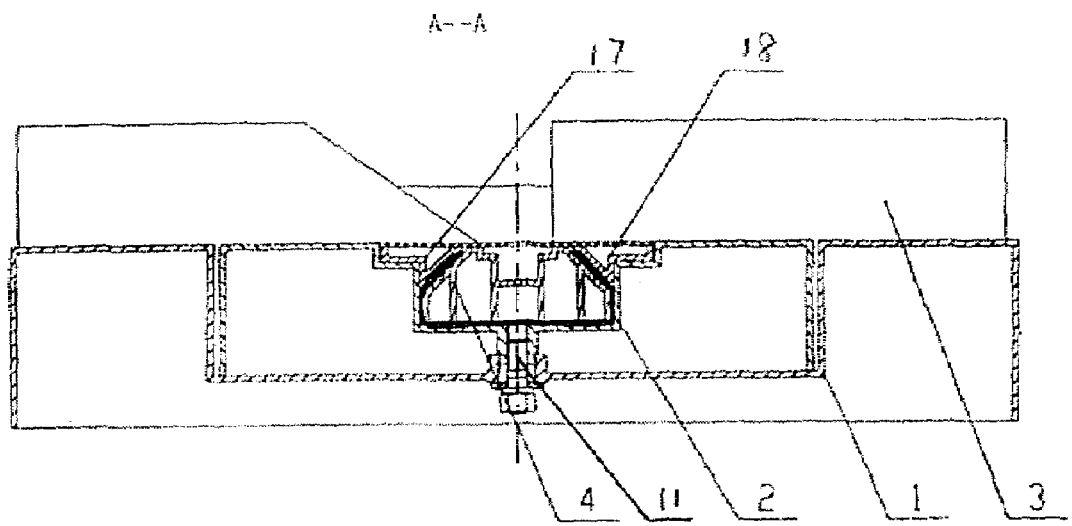
FIG. 6 shows a section view along line A-A of FIG. 4.
Figure 8:
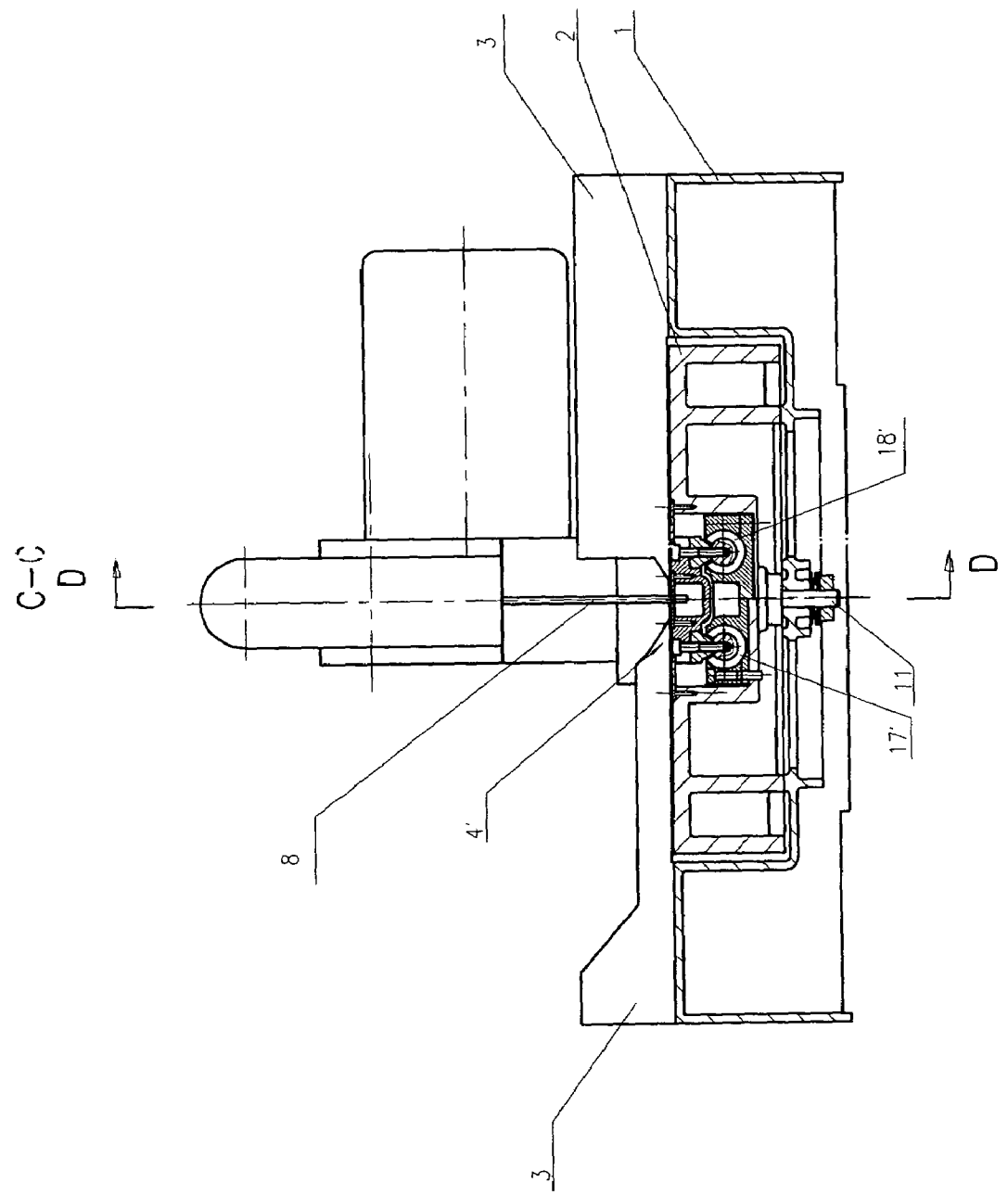
FIG. 8 shows a sectional view of a second embodiment of the present invention along C-C of FIG. 10.

The sliding miter saw includes a ram [4] slidably received in a guiding groove extending fully across the upper surface of the turntable [2] and arranged in a substantially diametrical position. As best shown in FIGS. 6 and 8, the ram [4] provides a cutting support surface, and the upper surface of the turntable [2] is within substantially the same plane as the cutting support surface. A linear bearing is provided in the guiding groove (see FIGS. 6 and 11) which constitutes three elongate, low friction plates [40-43]. A first fixing member [17] and a second fixing member [18] in the form of elongate compressor plates are fixed on the turntable [2] to restrain the up-and-down movement of the ram [4] permitting a smooth sliding movement of the ram [4] in the guiding groove. A front end portion of the ram [4] extends beyond the turntable [2] when the ram [4] is at its extreme position (as shown in FIG. 2). An elongate slot [15] is provided on a front portion of the ram [4] under the saw blade [8] and receives the saw blade [8] when the saw unit is pivoted downwardly to the working position.

Figure 4:
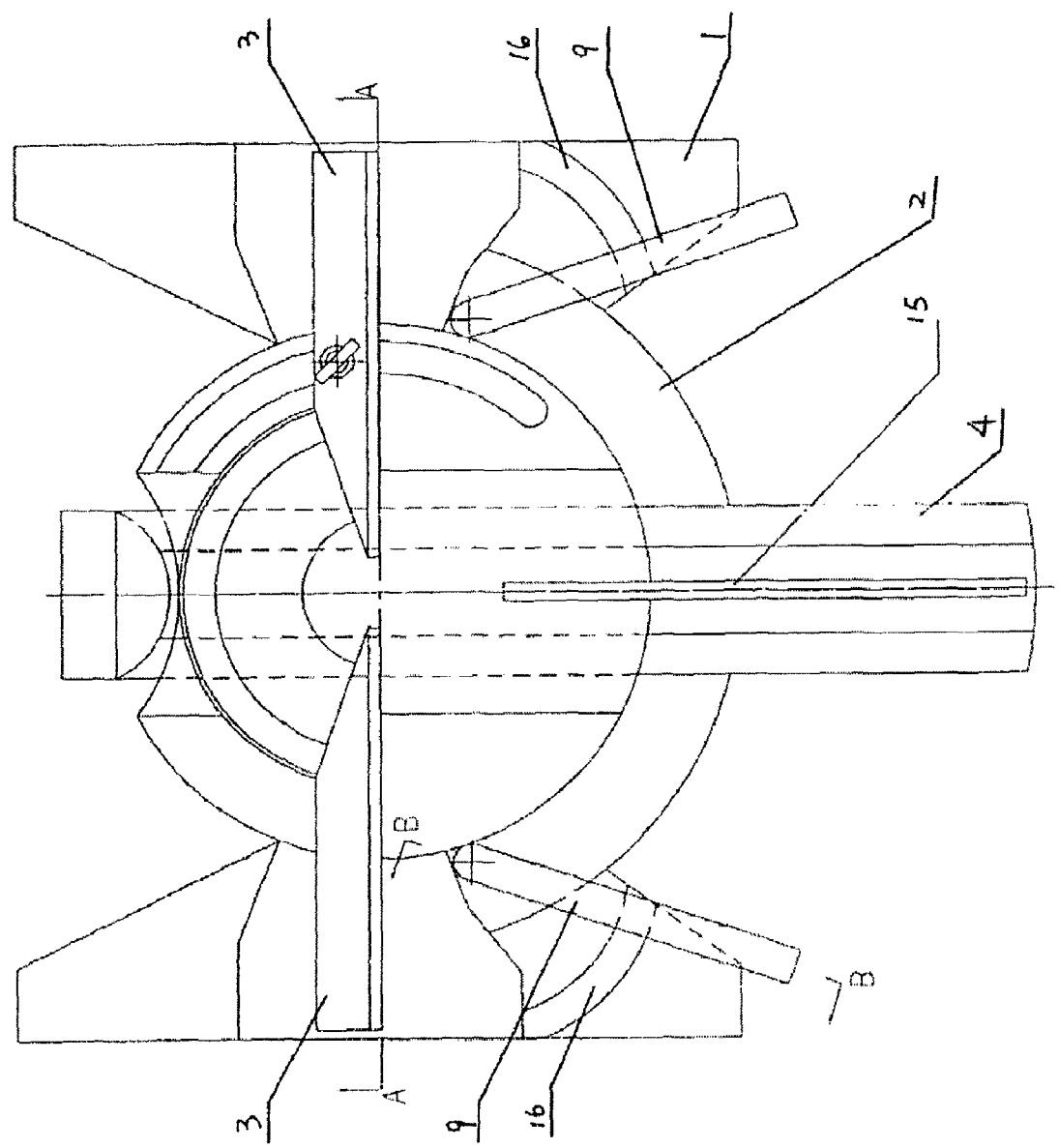
FIG. 4 shows a top view of the first embodiment of the present invention in which the ram is pulled back (with the saw unit and the supporting member omitted)

Opposing edges of the upper surface of the base [1] connect to a first end portion of horizontally disposed first and second additional supporting members [9] respectively. The second end portion of each additional supporting member [9] extends beyond the base [1]. The additional supporting members [9] are generally used in the states shown in FIG. 2 and FIG. 4 and together with the ram [4] and a guard [3] support the workpiece during sawing. A bevel locking member [13] may be used to lock the supporting member [5].

Figure 5:
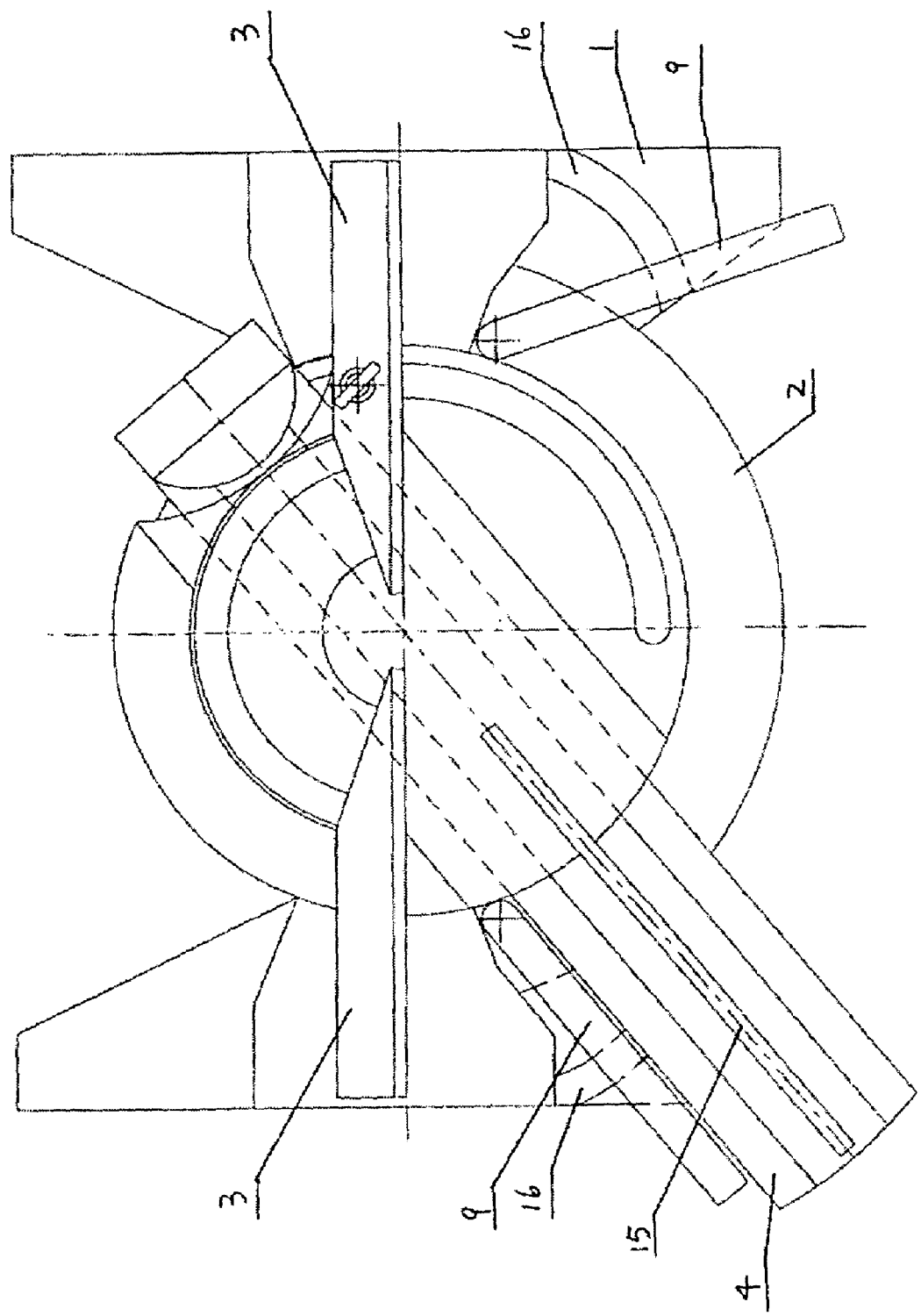
FIG. 5 shows a top view of the first embodiment of the present invention in which the ram is arranged for mitering (with the saw unit and the supporting member omitted)
Figure 7:
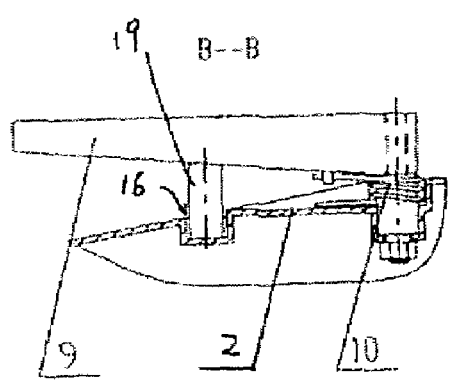
FIG. 7 shows a section view along line B-B of FIG. 4.

A torsion spring [10] surrounds the axis of the additional supporting members [9]. A first end of the torsion spring [10] connects with the additional supporting member [9] and a second end of the torsion spring [10] connects with the base [1]. In the state shown in FIG. 5 when the bracket [6] is rotating to a mitering position from a non-mitering position (FIGS. 1-4), the turntable [2] and the ram [4] rotate synchronously with the bracket [6] so that the ram [4] is able to push the front end portion of the additional supporting members [9] generally to the left side. The upper surface of the base [1] is provided with a guiding channel [16] for guiding the additional supporting member [9] in a substantially circumferential direction through the action of a dependent supporting foot [19] which is moveably received in the guiding channel [16] (see FIG. 7).

Figure 9:
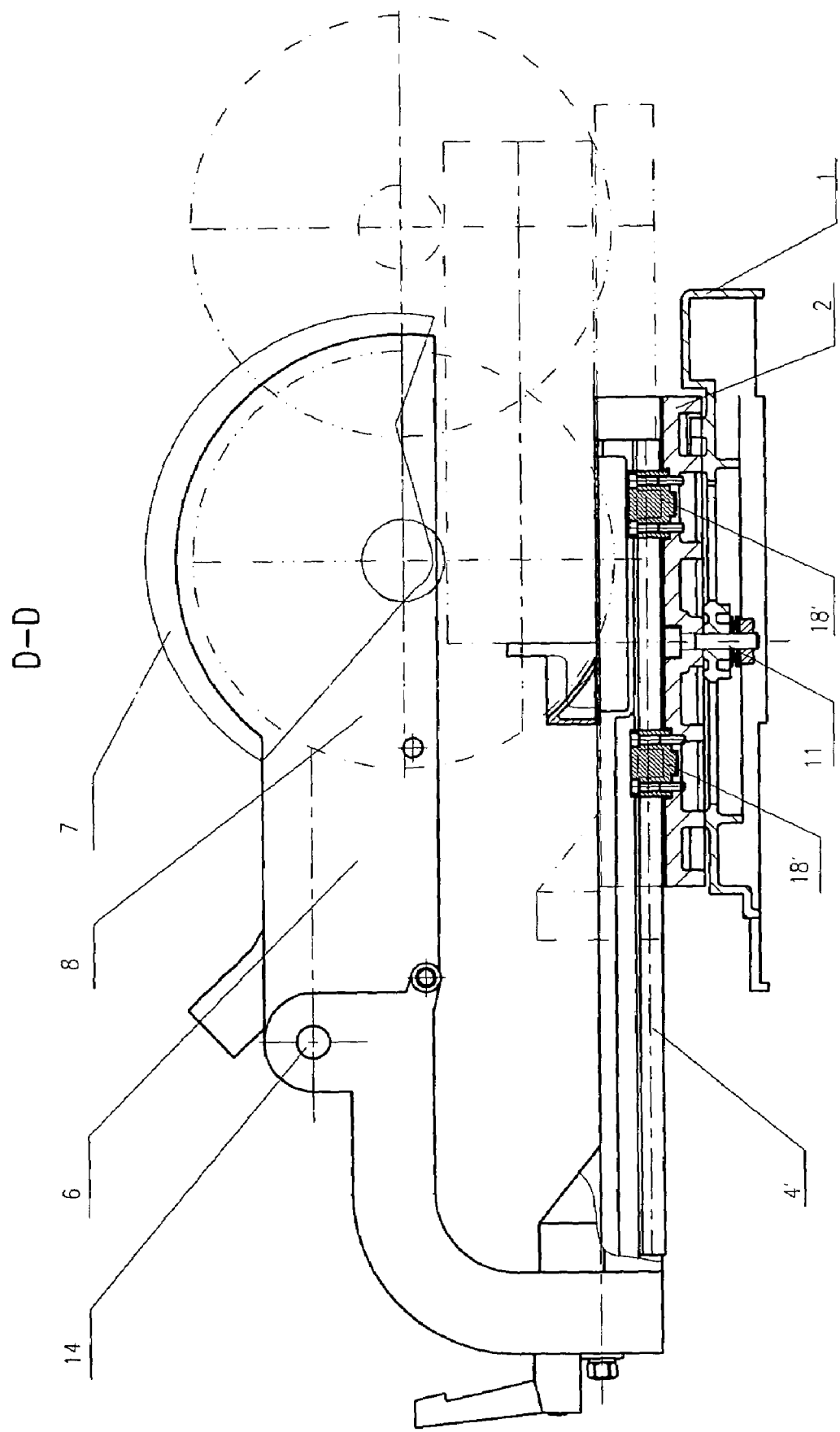
FIG. 9 shows a sectional view along D-D of FIG. 8.
Figure 10:
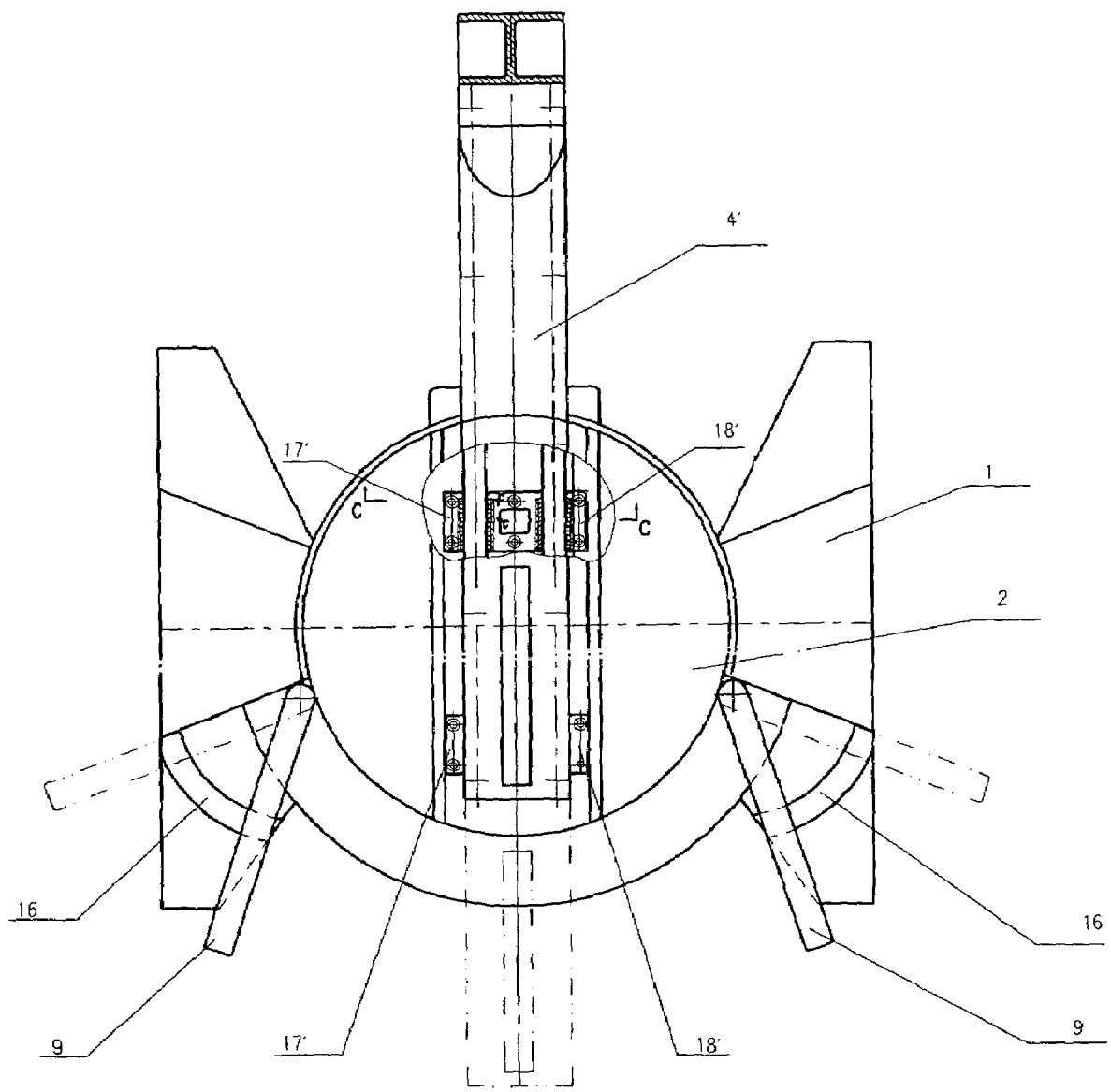
FIG. 10 shows a top view of the second embodiment of the present invention in which the ram is pushed out (with the saw unit and the supporting member omitted)

FIGS. 8-10 illustrate a second embodiment of the present invention which is similar to the first embodiment and wherever possible identical reference numerals have been adopted. A ram device [4'] is slidably supported in a guiding means (see FIG. 10). A first fixing member [17'] and a second fixing member [18'] are provided in a groove disposed on a turntable [2] to restrain the vertical movement of the ram [4'] and bearing means are disposed within the first fixing member [17'] and the second fixing member [18']. The first fixing member [17'] and the second fixing member [18'] take the form of sleeves fixed in the guiding groove which accommodate a plurality of balls. Sliding bars of the ram device are slidably received in the first fixing member [17'] and the second fixing member [18'] so that the ram [4'] is able to smoothly slide back and forth along a substantially diametrical direction of the turntable [2].

What is claimed is:

1. A sliding miter saw for sawing a workpiece comprising:
   a saw unit including
      a motor including an armature which has a first rotating axis and which is connected to the saw blade via a transmission device and
      a saw blade having a second rotating axis, wherein said first rotating axis is parallel with and spaced apart from the second rotating axis;
   a base device including
      a base and
      a turntable which is pivotally connected to the base so as to rotate the saw unit between a non-mitering position and a mitering position, the turntable having an upper surface;
   a bracket for mounting the saw unit which is rotatable about an axis to move the saw unit between an elevated, non-working position and a non-elevated working position;
   a supporting member to an upper portion of which is pivotally joined a rear end portion of the bracket;
   a guiding groove extending along the upper surface of the turntable and arranged in a substantial diametrical position; and
   a ram slideably received in the guiding groove, wherein a rear end portion of the ram is pivotally joined to a lower end portion of the supporting member, wherein an elongate slot in a front portion of the ram receives the saw blade when the saw unit is moved to the non-elevated working position, and wherein the elongate slot moves synchronously with the saw unit.

2. The sliding miter saw of claim 1, wherein the guiding groove extends fully along the diametrical direction of the turntable and a front end portion of the ram extends beyond the edge of the turntable when the ram is at its extreme position.

3. The sliding miter saw as claimed in claim 1 further comprising restraining means for vertically restraining the ram in the guiding groove.

4. The sliding miter saw of claim 1, wherein the ram is slideably received in the guiding groove to permit movement of ram in forward and rearward directions, and wherein the elongate slot moves in the forward and rearward directions synchronously with the saw unit.

5. The sliding miter saw of claim 1, wherein opposing edges of the upper surface of the base pivotally connect to a first end portion of horizontally disposed first and second additional supporting members respectively, and wherein the second end portion of the additional supporting members extends beyond the base.

6. The sliding miter saw of claim 5, wherein an elastic member provided on the additional supporting member biases the second end portion of the additional supporting member towards its extreme position.

7. The sliding miter saw of claim 5, wherein the upper surface of the base is provided with a guiding channel for guiding the additional supporting member in a substantially circumferential direction through the action of a supporting foot which is moveably received in the guiding channel.

8. The sliding miter saw of claim 1, wherein the ram provides a cutting support surface.

9. The sliding miter saw of claim 8, wherein the cutting support surface is within substantially the same plane as the upper surface of the turntable.

10. A sliding miter saw comprising:
    a base device including a base and a turntable which is pivotally connected with said base, the turntable having an upper surface provided with a guiding groove arranged in a substantial diametrical position;

a motor including an armature which has a first rotating axis;

a saw blade having a second rotating axis;

a bracket for a saw unit, on which said saw blade and said motor are provided, said first rotating axis is parallel with and spaced from said second rotating axis, said motor is connected with said saw blade via transmission device;

a supporting member, on which a hinge pivot shaft is provided and said bracket for the saw unit hinging with said supporting member; and a ram slideable received in said guiding groove, wherein a rear end portion of said ram is pivotally joined with a lower end portion of said supporting member, a rear end portion of said bracket for saw unit is pivotally joined with a upper portion of said supporting member, and wherein an elongate slot in a front portion of the ram receives the saw blade when the saw unit is moved to the non-elevated working position, and wherein the elongate slot moves synchronously with the saw unit.

11. The sliding miter saw of claim 10, wherein the ram is slideably received in the guiding groove to permit movement of ram in forward and rearward directions, and wherein the elongate slot moves in the forward and rearward directions synchronously with the saw unit.

12. The sliding miter saw of claim 10, wherein the ram provides a cutting support surface.

13. The sliding miter saw of claim 12, wherein the cutting support surface is within substantially the same plane as the upper surface of the turntable.

* * * * *